United States Patent
Knebel et al.

(10) Patent No.: US 6,388,807 B1
(45) Date of Patent: May 14, 2002

(54) CONFOCAL LASER SCANNING MICROSCOPE

(75) Inventors: Werner Knebel, Kronau; Heinrich Ulrich, Heidelberg, both of (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/679,974

(22) Filed: Oct. 5, 2000

(30) Foreign Application Priority Data

Oct. 12, 1999 (DE) .......................... 199 49 272

(51) Int. Cl.[7] .............................. G02B 21/00
(52) U.S. Cl. .................. 359/368; 359/385; 359/225
(58) Field of Search .................. 356/237, 239; 359/368, 385, 386, 388, 389, 232, 234, 235, 225

(56) References Cited

U.S. PATENT DOCUMENTS

| 5,260,578 A | * | 11/1993 | Bliton et al. ............. 250/461.1 |
| 5,506,725 A | * | 4/1996 | Koike et al. ................ 359/388 |
| 5,578,818 A | | 11/1996 | Kain et al. .................. 250/234 |
| 5,631,141 A | * | 5/1997 | Sonek et al. ................. 435/29 |
| 5,822,055 A | * | 10/1998 | Tsai et al. .................. 356/237 |
| 5,936,728 A | * | 8/1999 | Bouzid ....................... 356/318 |

* cited by examiner

Primary Examiner—Mark A. Robinson
(74) Attorney, Agent, or Firm—Simpson & Simpson, PLLC

(57) ABSTRACT

A confocal laser scanning microscope having at least one laser light source (1) for illuminating a specimen (2) and at least one detector (4) for detecting the detected light (3) coming from the specimen is characterized, in order to expand CLSM applications with regard to the use of light sources with lower acquisition and operating costs, in that an additional light source (5, 8) is provided that is not a single-mode (TEM00) laser light source.

43 Claims, 2 Drawing Sheets

CONFOCAL LASER SCANNING MICROSCOPE

CROSS REFERENCE TO RELATED APPLICATIONS

This invention claims priority of a German filed patent application DE 199 49 272.7

FIELD OF THE INVENTION

The present invention concerns a confocal laser scanning microscope having at least one laser light source for illuminating a specimen and at least one detector for detecting the detected light coming from the specimen.

BACKGROUND OF THE INVENTION

Laser scanning microscopes of the generic type have been known for some time, and are used, inter alia, in the semiconductor industry for wafer inspection and in biomedical basic research. Single-mode lasers that are capable of generating a diffraction-limited intensity distribution in the focal plane of a microscope objective are used as the light source for confocal laser scanning microscopy (CLSM). For this purpose, the laser light of a single-mode laser is usually focused onto a small illumination aperture having a diameter of approx. 100–300 µm, so that this illumination aperture constitutes the single-point light source of the CLSM.

Light sources that are not single-mode lasers cannot create confocal illumination that has sufficient illumination density in the form of a diffraction-limited intensity distribution at the microscope objective focus. The emitted light intensity of a spatially extended non-single-mode laser light source cannot be focused well enough onto such a small illumination aperture, so that the resulting illumination density at the microscope objective focus is too low for most CLSM applications. Merely by way of example, reference is made to U.S. Pat. No. 5,578,818, in which an LED (light-emitting diode) is used as the light source for a CLSM and in which these problems occur.

Depending on the CLSM application, lasers whose wavelength regions extend from the UV to the IR region are used. In particular, lasers that are suitable for CLSM microscopy and that emit light in the UV region are generally of considerable overall size and require a very particular laboratory structure, for example for a complex water-cooled circulation system. The high acquisition and operating costs of such a UV laser system are a particular barrier to extensive use.

SUMMARY OF THE INVENTION

It is therefore the object of the present invention to configure and develop a confocal laser scanning microscope of the generic type in such a way that light sources with low acquisition and operating costs can also be used for CLSM applications.

The aforesaid object is achieved by the features of claim 1. According to this, a confocal laser scanning microscope is characterized in that a light source is provided that is not a single-mode (TEM00) laser light source; and that in order to attain a sufficient signal-to-noise ratio in the image data of the specimen, the system parameters of the laser scanning microscope are adjustable.

What has been recognized according to the present invention is firstly that by coupling alternative light sources into a CLSM, the signal-to-noise ratio of the measured image data does not allow data analysis in the usual sense because of the low illumination density of the intensity distribution in the focal plane of the microscope objective. The system parameters of a CLSM can, however, be adjusted in such a way that the use of an additional light source is possible, with a sufficient signal-to-noise ratio in the image data. Suitable system parameters might be, for example, the diameter of the illumination or detection pinhole, the recording duration, or the gain of the detection signal.

The additional light source can be operated simultaneously with the laser light source of the CLSM for data recording. As a result, the specimen properties in terms of the light from the laser light source and the additional light source can be detected simultaneously, if suitable filters or beam splitters are present for the purpose in the beam path of the CLSM. If no corresponding filters/beam splitters are used, then the additional light source can be operated as an alternative to the laser light source. In this context, it might be possible first to perform a data recording that detects the specimen properties with the laser light source, and then to perform a data recording using the additional light source.

In a concrete embodiment, the detected light is detectable in accordance with the confocal principle. The detected light of the specimen is thus detected confocally when the specimen is illuminated both with the laser light source and with the additional light source. Since the detected light of the specimen passes along the same optical beam path when illuminated both with a laser light source and with an additional light source, this ensures that the image data recorded in this fashion are coincident in terms of their spatial coordinates (co-localization).

In very general terms, it is conceivable for the additional light source to be configured as a metal halide vapor lamp, as a discharge lamp, or as an arc lamp. With regard to a specific CLSM application, the additional light source used in each case is to be selected and coupled into the CLSM as a function of the particular properties of the light required for it.

An HBO or XBO lamp could be used as the additional light source.

Advantageously, an HBO lamp is usually already present in confocal fluorescence laser scanning microscopes, since these are often also operated as conventional fluorescence microscopes, so that a corresponding utilization thereof for confocal detection is associated with little additional design outlay and thus with almost no additional cost. In particular, the high light emission in the UV and visible regions makes possible a number of CLSM applications.

A halogen lamp could furthermore be used as the additional light source. On the one hand this could be a halogen lamp that is matched to a specific application; on the other hand the lamp of the conventional microscope—which, like the HBO lamp, is generally present in a CLSM—could be used.

A multi-mode laser could also serve as the additional light source. The use of an LED or an electron beam collision light source is also conceivable.

Light of the additional light source is coupled into the beam path of the CLSM by way of mirrors, lenses, and filters. In this context, lenses can be used to influence the beam properties of the light of the additional light source, and the beam direction of the light of the additional light source can be modified with one or more mirrors and lastly can be coupled with a filter or beam combiner into the beam path of the CLSM. This filter/beam combiner could, for example, be embodied as a dichroic beam splitter.

Advantageously, the coupling of light of the additional light source into the beam path of the CLSM is accomplished by way of an optical fiber. The use of an optical fiber yields the known advantages of an optical element of this kind, namely vibrational decoupling between the CLSM and additional light source, and flexible light transport with no reservations in terms of safety precautions.

Advantageously, light of the additional light source is coupled into the optical fiber without coupling-in optics. Thus there is no focusing optical system, for example in the form of a lens, between the lamp body and the optical fiber end; instead the optical fiber end is positioned directly on the lamp body. All that is necessary for this purpose is to make available a suitable device that establishes and immobilizes the position of the optical fiber end relative to the lamp.

The optical fiber is configured, in terms of the wavelength region of the coupled-in light, as either a single-mode or multi-mode optical fiber. With regard to the total intensity of the light of the additional light source to be coupled in, and the intensity distribution over the cross section of the light beam emerging from the optical fiber, a multi-mode optical fiber may be preferentially used. The latter allows more light to be transported if the beam profile of the light emerging from the optical fiber plays a subordinate role.

In a concrete embodiment, illumination with the additional light source takes place in such a way that a largely point-like intensity distribution exists in the specimen plane of the microscope objective. This kind of illumination could be achieved with a suitable arrangement of mirrors, lenses, illumination apertures, and filters. Ultimately the beam guidance of the light of the additional light source is comparable to that of the laser light source of the CLSM. In particularly advantageous fashion, the point-like illumination is diffraction-limited. This would then result in confocal illumination by way of the additional light source.

In a further embodiment, illumination with the additional light source is implemented as conventional bright-field microscope illumination. The optical system that couples the additional light source into the beam path of the CLSM is configured in such a way that the entire specimen field of the microscope objective can be illuminated with light of the additional light source. In an advantageous embodiment of the invention, the detected light that returns from the specimen in the context of this type of illumination is detected in accordance with the confocal principle using the detector of the CLSM. In comparable fashion, illumination with the additional light source as conventional dark-field microscope illumination is conceivable.

Illumination by the additional light source in the specimen plane could also be accomplished in the form of an illumination pattern. Here again, the size and shape of the illumination pattern of the coupling-in optical system can be shaped by the additional light source. It is thus possible in advantageous fashion, for example by introducing replaceable projection patterns, to vary the illumination pattern in the specimen plane. In a concrete application, the illumination pattern in the specimen plane is circular and has a diameter of 10 $\mu$m.

The CLSM equipped with an additional light source can be used, in particular, for fluorescence microscopy. For example, a CLSM having an HBO lamp as the additional light source could be used to excite, with the UV portion of the emission spectrum of the HBO lamp, fluorescent dyes whose absorption spectrum lies in the UV region. As a result, it is unnecessary to acquire an expensive UV laser that occupies a great deal of space and is cumbersome to operate. It is also conceivable to use a CLSM that has a corresponding additional light source to excite fluorescent dyes whose absorption spectrum lies in the visible or IR region.

For basic medical research in particular, FRET microscopy could be performed with a microscope according to the present invention. With this technique, dyes are excited by illumination and emit the excitation energy, or portions thereof, in nonradiative fashion to adjacent dyes, which are thereby in turn excited and emit characteristic electromagnetic radiation. For example, CFP (cyan fluorescent protein) as donor and EGFP (enhanced green fluorescent protein) as acceptor would be suitable. In addition, it would be possible with a microscope according to the present invention to excite fluorescent dyes that are suitable as caged compounds. This application requires excitation light in the UV region, which can be achieved, for example, with an HBO lamp as the additional light source.

In particularly advantageous fashion, in order to attain a usable signal-to-noise ratio in the image data, the specimen is scanned sufficiently often that the image data thereby recorded can be averaged. Since the coupling in of an additional light source generally results in a lower light intensity in the specimen region compared to the laser light source of a CLSM, the signal of the detected light produced by the additional light source is weaker than the detected light produced by the laser light source of the CLSM. Repeated recording of data from the same specimen region allows statistical averaging, which takes into account the smaller detected signal. In the same fashion, the integration time per pixel during scanning of the specimen can be selected accordingly. For example, the integration time per pixel for the detected light produced by the additional light source could be five times as long as for the detected light produced by the laser light source of the CLSM. This would consequently be associated with a fivefold increase in the data recording time.

A usable signal-to-noise ratio could also be attained by selecting the diameter of the detection pinhole. A greater diameter for the detection pinhole results in an elevated signal-to-noise ratio in the detected image data; in this case the spatial resolution of the corresponding data recording is then reduced in accordance with the underlying optical correlations.

BRIEF DESCRIPTION OF THE DRAWINGS

There are various ways of advantageously embodying and developing the teaching of the present invention. Reference is made, for that purpose, on the one hand to the claims which follow claim 1, and on the other hand to the explanation below of exemplary embodiments of the invention with reference to the drawings. In conjunction with the explanation of the preferred exemplary embodiments with reference to the drawings, a general explanation is also given of preferred embodiments and developments of the teaching. In the drawings:

DETAILED DESCRIPTION OF THE INVENTION

Figure 1:
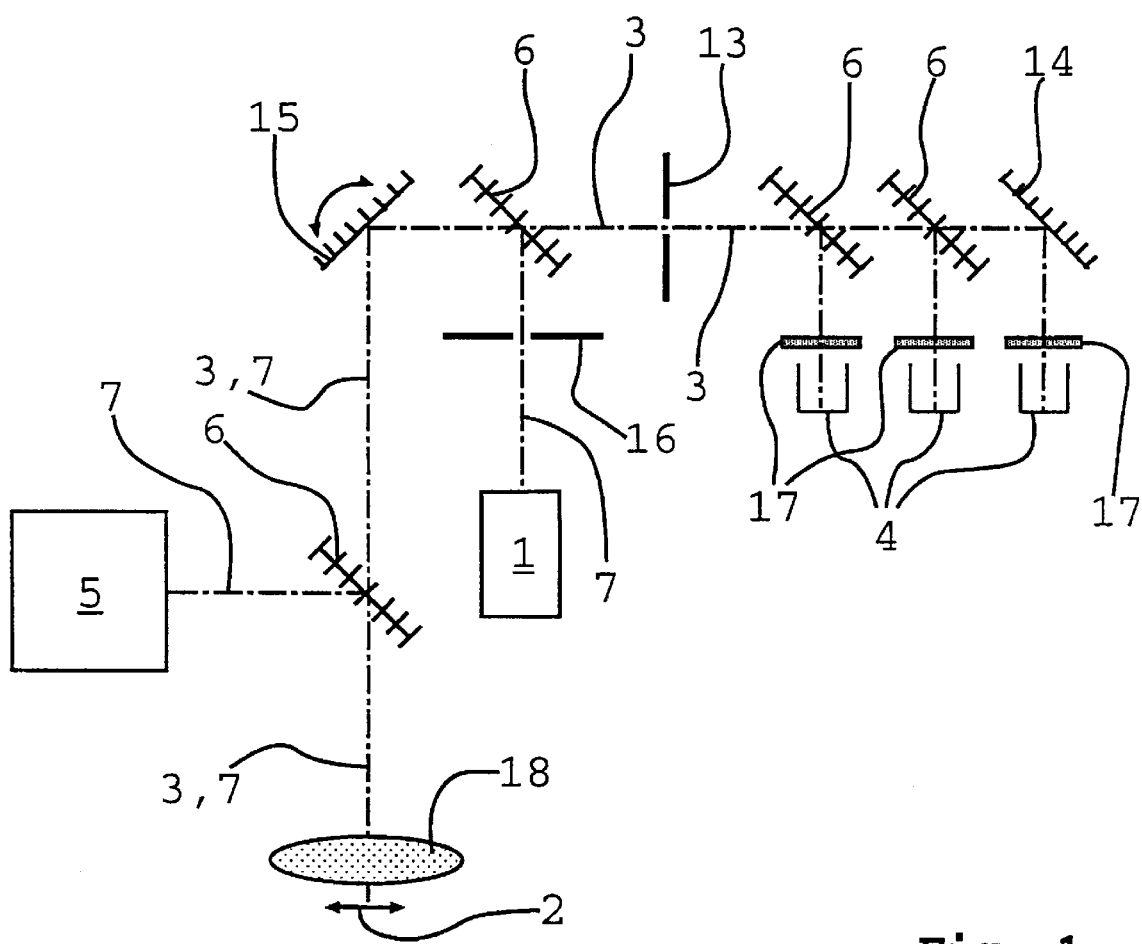
FIG. 1 shows, chematic depiction, a first exemplary embodiment of a confocal laser scanning microscope according to the present invention.
Figure 2:
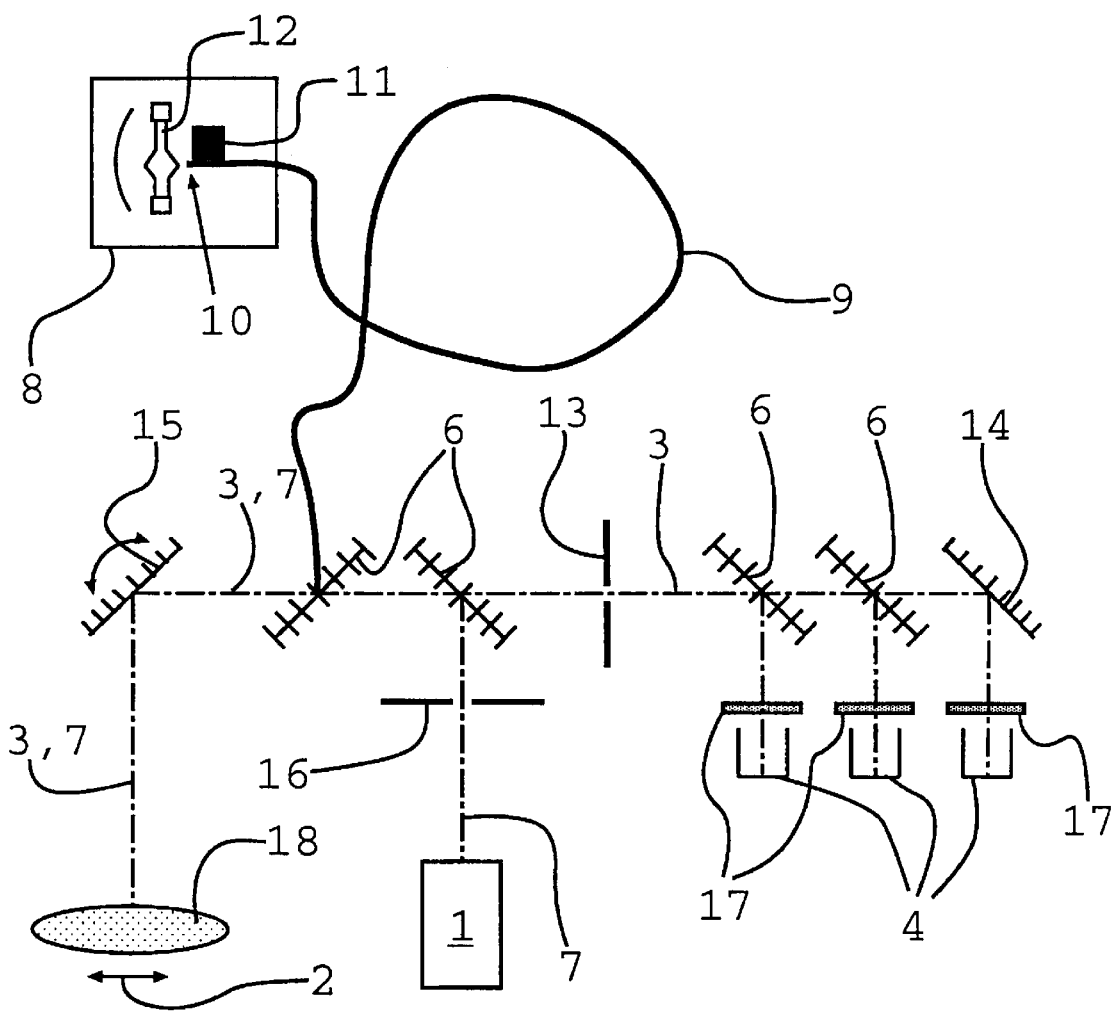
FIG. 2 shows, in a schematic depiction, a further exemplary embodiment of a confocal laser scanning microscope according to the present invention.

FIGS. 1 and 2 each show a confocal laser scanning microscope having a laser light source 1. Laser light source 1 serves to illuminate a specimen 2. Detected light 3 coming from specimen 2 is detected in terms of its spectral properties with the three detectors 4.

In the exemplary embodiment as shown in FIG. 1, an HBO lamp 5, whose light 7 is coupled by way of a dichroic beam splitter 6 into illumination beam path 7 of the CLSM, is provided as the additional light source.

In the exemplary embodiment as shown in FIG. 2, the additional light source, embodied as XBO lamp 8, is coupled by way of an optical fiber 9 into the beam path of the CLSM. The light of XBO lamp 8 is coupled directly, and without the use of additional coupling-in optics, into the entrance end of optical fiber 10. Optical fiber end 10 can be positioned and immobilized directly on lamp housing 12 of the XBO lamp with positioning device 11. The light of XBO lamp 8 emerges at the other optical fiber end, and is coupled into illumination beam path 7 via dichroic beam splitter 6. Optical fiber 9 is embodied, in terms of the wavelength region of the light of XBO lamp 8, as a multi-mode optical fiber.

Exciting light 7 of HBO lamp 5 in FIG. I results, because of the coupling-in optical system and beam guidance in the CLSM, in conventional bright-field microscope illumination in the specimen plane.

In the exemplary embodiment as shown in FIG. 2, the illumination of exciting light 7 of XBO lamp 8 is implemented as point-like illumination as a result of the beam guidance in the CLSM.

The confocal CLSM according to the present invention as shown in FIG. 1 is used for fluorescence microscopy, specifically in biological basic research. In this concrete application, laser 1—which is embodied as an argon-krypton laser and emits lights with wavelengths of 488 nm, 568 nm, and 647 nm —excites fluorescent dyes that are bound specifically to certain specimen regions of biological specimens. HBO lamp 5, as the additional light source, excites the fluorescent dye DAPI, which can be excited in a region between 355 and 375 nm.

In both exemplary embodiments, in order to obtain a usable signal-to-noise ratio in the image data the specimen is scanned five times, so that the image data thus recorded can be averaged. When the specimen is scanned, the integration time for detection of the detected light induced by additional light source 5, 8 is five times as long as that for the detected light induced by the laser light source. The diameter of the detection pinhole for the detection of detected light that has been induced by additional light source 5, 8 is three times as large as for the detection of the detected light that was induced by laser light source 1.

In conclusion, be it noted very particularly that the exemplary embodiment set forth above serves merely to describe the teaching claimed, but does not limit it to the exemplary embodiments.

PARTS LIST

Laser light source
Specimen
Detected light
Detectors
HBO lamp
Filter, dichroic beam splitter
Illumination beam path
XBO lamp
Optical fiber
Entrance end of (9)
Positioning device for (10)
Lamp housing
Detection pinhole
Mirror
Scanning mirror
Illumination pinhole
Absorbing filter
Objective

What is claimed is:

1. A confocal laser scanning microscope defining a beam path comprises at least one laser light source (1) for illuminating a specimen (2), at least one detector (4) for detecting light (3) coming from the specimen; an additional light source (5, 8) that is not a single-mode (TEM00) laser light source; and system parameter adjustment means for influencing signal-to-noise ratio in the image data of the specimen.

2. The microscope as defined in claim 1, wherein the additional light source (5, 8) is operated simultaneously with the laser light source (1).

3. The microscope as defined in claim 1, wherein the additional light source (5, 8) is operated alternatively to the laser light source (1).

4. The microscope as defined in claim 1, wherein the additional light source (5, 8) is chosen from the group of light sources consisting of a metal halide vapor lamp, a discharge lamp, an arc lamp, an HBO lamp, an XBO lamp, a halogen lamp, a multi-mode laser, an LED (light-emitting diode) and an electron beam collision light source.

5. The microscope as defined in claim 4, wherein light of the additional light source (5, 8) is coupled into the beam path of the confocal laser scanning microscope by way of mirrors, lenses, and filters (6).

6. The microscope as defined in claim 5, wherein the coupling of light of the additional light source (8) into the beam path of the confocal laser scanning microscope is accomplished by way of an optical fiber (9), defining a coupling-in fiber end (10).

7. The microscope as defined in claim 6, wherein light of the additional light source (8) is coupled into the optical fiber (9) without coupling-in optics.

8. The microscope as defined in claim 6, wherein the optical fiber end (10) is positioned directly on a lamp body (12).

9. The microscope as defined in claim 6, wherein the optical fiber (9) is a single-mode optical fiber in terms of the wavelength region of the coupled-in light.

10. The microscope as defined in claim 6, wherein the optical fiber (9) is a multi-mode optical fiber in terms of the wavelength region of the coupled-in light.

11. The microscope as defined in claim 1, wherein illumination with the additional light source (5, 8) in the specimen plane is point-like.

12. The microscope as defined in claim 11, wherein the point-like illumination is diffraction-limited.

13. The microscope as defined in claim 1, wherein illumination with the additional light source (5, 8) is implemented as conventional bright-field microscope illumination.

14. The microscope as defined in claim 1, wherein illumination with the additional light source (5, 8) is implemented as conventional dark-field microscope illumination.

15. The microscope as defined in claim 1, wherein illumination by the additional light source (5, 8) in the specimen plane is accomplished with an illumination pattern.

16. The microscope as defined in claim 15, wherein the illumination pattern is circular.

17. The microscope as defined in claim 1, wherein to influence signal-to-noise ratio in the image data, the specimen is scanned a plurality of times so that the image data thereby recorded can be averaged.

18. The microscope as defined in claim 17, wherein to influence signal-to-noise ratio in the image data, the integration time per pixel during scanning of the specimen is selected.

19. The microscope as defined in claim 17, wherein to influence signal-to-noise ratio in the image data, the diameter of the detection pinhole is selected.

20. A confocal laser fluorescence microscope comprises at least one laser light source (1) for illuminating a specimen (2), at least one detector (4) for detecting light (3) coming from the specimen; an additional light source (5, 8) that is not a single-mode (TEM00) laser light source; and system parameter adjustment means for influencing signal-to-noise ratio in the image data of the specimen.

21. The microscope as defined in claim 20, wherein the additional light source (5, 8) is operated simultaneously with the laser light source (1).

22. The microscope as defined in claim 20, wherein the additional light source (5, 8) is operated alternatively to the laser light source (1).

23. The microscope as defined in claim 20, wherein the additional light source (5, 8) is chosen from the group of light sources consisting of a metal halide vapor lamp, a discharge lamp, an arc lamp, an HBO lamp, an XBO lamp, a halogen lamp, a multi-mode laser, an LED (light-emitting diode) and an electron beam collision light source.

24. The microscope as defined in claim 23, wherein light of the additional light source (5, 8) is coupled into the beam path of the confocal laser fluorescence microscope by way of mirrors, lenses, and filters (6).

25. The microscope as defined in claim 24, wherein the coupling of light of the additional light source (8) into the beam path of the confocal laser fluorescence microscope is accomplished by way of an optical fiber (9), defining a coupling-in fiber end (10).

26. The microscope as defined in claim 25, wherein light of the additional light source (8) is coupled into the optical fiber (9) without coupling-in optics.

27. The microscope as defined in claim 25, wherein the optical fiber end (10) is positioned directly on a lamp body (12).

28. The microscope as defined in claim 25, wherein the optical fiber (9) is a single-mode optical fiber in terms of the wavelength region of the coupled-in light.

29. The microscope as defined in claim 25, wherein the optical fiber (9) is a multi-mode optical fiber in terms of the wavelength region of the coupled-in light.

30. The microscope as defined in claim 20, wherein illumination with the additional light source (5, 8) in the specimen plane is point-like.

31. The microscope as defined in claim 30, wherein the point-like illumination is diffraction-limited.

32. The microscope as defined in claim 20, wherein illumination with the additional light source (5, 8) is implemented as conventional bright-field microscope illumination.

33. The microscope as defined in claim 20, wherein illumination with the additional light source (5, 8) is implemented as conventional dark-field microscope illumination.

34. The microscope as defined in claim 20, wherein illumination by the additional light source (5, 8) in the specimen plane is accomplished with an illumination pattern.

35. The microscope as defined in claim 34, wherein the illumination pattern is circular.

36. The microscope as defined in claim 20, wherein said additional light source emits light that excites fluorescent dyes whose absorption spectrum lies in the UV region.

37. The microscope as defined in claim 20, wherein said additional light source emits light that excites fluorescent dyes whose absorption spectrum lies in the visible region.

38. The microscope as defined in claim 20, wherein said additional light source emits light that excites fluorescent dyes whose absorption spectrum lies in the IR region.

39. The microscope as defined in claim 20, wherein said additional light source emits light that excites fluorescent dyes that are suitable for FRET (fluorescent resonant energy transfer).

40. The microscope as defined in claim 20, wherein said additional light source emits light that excites fluorescent dyes that are suitable as caged compounds.

41. The microscope as defined in claim 20, wherein to influence signal-to-noise ratio in the image data, the specimen is scanned a plurality of times so that the image data thereby recorded can be averaged.

42. The microscope as defined in claim 41, wherein to influence signal-to-noise ratio in the image data, the integration time per pixel during scanning of the specimen is selected.

43. The microscope as defined in claim 41, wherein to influence signal-to-noise ratio in the image data, the diameter of the detection pinhole is selected.

* * * * *